(12) United States Patent
Nemoto

(10) Patent No.: US 10,930,898 B2
(45) Date of Patent: Feb. 23, 2021

(54) POWER STORAGE DEVICE AND METHOD OF MANUFACTURING POWER STORAGE DEVICE

(71) Applicant: TOYOTA JIDOSHA KABUSHIKI KAISHA, Toyota (JP)

(72) Inventor: Yuta Nemoto, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 135 days.

(21) Appl. No.: 16/180,080

(22) Filed: Nov. 5, 2018

(65) Prior Publication Data

US 2019/0140218 A1     May 9, 2019

(30) Foreign Application Priority Data

Nov. 8, 2017    (JP) .............................. JP2017-215649

(51) Int. Cl.
| | |
|---|---|
| *H01M 2/02* | (2006.01) |
| *H01M 2/04* | (2006.01) |
| *H01M 4/04* | (2006.01) |
| *H01M 2/30* | (2006.01) |
| *H01M 2/06* | (2006.01) |
| *H01M 2/22* | (2006.01) |
| *H01M 4/02* | (2006.01) |

(52) U.S. Cl.
CPC ............ *H01M 2/021* (2013.01); *H01M 2/04* (2013.01); *H01M 2/06* (2013.01); *H01M 2/22* (2013.01); *H01M 2/30* (2013.01); *H01M 4/0471* (2013.01); *H01M 2002/0205* (2013.01); *H01M 2004/027* (2013.01)

(58) Field of Classification Search
None
See application file for complete search history.

(56) References Cited

U.S. PATENT DOCUMENTS

| | | | |
|---|---|---|---|
| 2015/0180004 A1* | 6/2015 | Harayama | H01M 2/08 429/158 |
| 2016/0043353 A1* | 2/2016 | Tsutsumi | H01M 2/02 429/158 |
| 2017/0117510 A1 | 4/2017 | Takasu et al. | |
| 2017/0237059 A1* | 8/2017 | Li | H01M 2/305 429/61 |

FOREIGN PATENT DOCUMENTS

JP         2017-084585 A     5/2017

\* cited by examiner

*Primary Examiner* — Wyatt P McConnell
(74) *Attorney, Agent, or Firm* — Sughrue Mion, PLLC

(57) ABSTRACT

A power storage device includes an electrode assembly, an accommodation case accommodating the electrode assembly, an external terminal provided on an outer surface of the accommodation case, a collector terminal connecting the electrode assembly and the external terminal, and a welding portion connecting the collector terminal and the external terminal. The external terminal includes an opposed surface opposed to the outer surface and an outer surface located opposite to the opposed surface. The external terminal has an insertion hole extending from the opposed surface toward the outer surface and a step portion located around an opening in the insertion hole located on a side of the outer surface. The collector terminal includes a contact surface in contact with a surface of the step portion. The welding portion is formed to weld the surface of the step portion and the contact surface.

6 Claims, 14 Drawing Sheets

POWER STORAGE DEVICE AND METHOD OF MANUFACTURING POWER STORAGE DEVICE

This nonprovisional application is based on Japanese Patent Application No. 2017-215649 filed with the Japan Patent Office on Nov. 8, 2017, the entire contents of which are hereby incorporated by reference.

BACKGROUND

Field

The present disclosure relates to a power storage device and a method of manufacturing a power storage device.

Description of the Background Art

Various power storage devices have conventionally been proposed. For example, a power storage device described in Japanese Patent Laying-Open No. 2017-84585 includes an electrode assembly, a battery case, a positive electrode collector terminal and a negative electrode collector terminal, and a positive electrode external terminal and a negative electrode external terminal.

The battery case includes a case main body with an opening, and a lid provided on the case main body so as to close the opening.

The positive electrode external terminal includes an insulating member provided on an upper surface of the lid, a plate-shaped member provided on the insulating member, and a positive electrode bolt.

The positive electrode collector terminal includes a protrusion which protrudes upward and a rivet portion is formed at an upper end of the protrusion. The rivet portion is engaged with the plate-shaped member of the positive electrode external terminal. An outer circumferential edge of the rivet portion of the positive electrode collector terminal is welded to an upper surface of the plate-shaped member. The negative electrode collector terminal is also formed similarly to the positive electrode collector terminal.

SUMMARY

In forming the rivet portion of the positive electrode collector terminal in the power storage device, initially, the protrusion of the positive electrode collector terminal is inserted in a through hole formed in the positive electrode external terminal. The rivet portion is formed by deforming an upper end of the protrusion. Thereafter, the outer circumferential edge of the rivet portion and the plate-shaped member of the positive electrode external terminal are welded.

As the upper end of the protrusion is riveted to form the rivet portion, an outer circumferential surface of the rivet portion is formed such that a central portion thereof swells outward.

When the upper surface of the rivet portion and the plate-shaped member are welded in a state above, a void tends to be produced between a portion which has been the outer circumferential surface of the rivet portion and the upper surface of the plate-shaped member. Such a void tends to lead to fracture of a welded portion and welding will be defective.

Though defective welding between the positive electrode collector terminal and the positive electrode external terminal is described above, this problem is also applicable to welding between the negative electrode collector terminal and the negative electrode external terminal.

The present disclosure was made in view of the problem above, and an object thereof is to provide a power storage device in which a collector terminal and an external terminal can satisfactorily be welded to each other.

A power storage device according to the present disclosure includes an electrode assembly, an accommodation case which accommodates the electrode assembly therein, an external terminal provided on an outer surface of the accommodation case, a collector terminal which connects the electrode assembly and the external terminal to each other, and a welding portion which connects the collector terminal and the external terminal to each other. The external terminal includes an opposed surface opposed to the outer surface of the accommodation case and an outer surface located opposite to the opposed surface. The external terminal has an insertion hole which extends from the opposed surface toward the outer surface of the external terminal and a step portion located around an opening in the insertion hole located on a side of the outer surface of the external terminal. The collector terminal includes a contact surface in contact with a surface of the step portion. The welding portion is formed to weld the surface of the step portion and the contact surface of the collector terminal.

According to the power storage device, production of a gap between a projection and the step portion is less likely and production of a void in the welding portion can be suppressed.

The surface of the step portion is formed as extending away from the opening in a direction from a side of the opposed surface toward the outer surface of the external terminal.

According to the power storage device, since the surface of the step portion is formed as being inclined, production of a gap between the surface of the step portion and the contact surface of the projection in a process of forming the projection can be suppressed.

A recess is formed in the surface of the external terminal. The recess includes a bottom surface and an inner circumferential surface located around the bottom surface. The insertion hole is connected to the bottom surface of the recess and the opening in the insertion hole is formed in the bottom surface of the recess. The surface of the step portion serves as the inner circumferential surface of the recess.

According to the power storage device, the step portion is formed by the bottom surface and a circumferential surface of the recess formed in the surface of the external terminal. Therefore, the step portion can be formed by making a recess in the surface of the external terminal. Consequently, the step portion can easily be formed.

The external terminal includes a raised portion formed around the insertion hole and the step portion is formed by the raised portion.

The step portion can be formed by forming a raised portion on the surface of the external terminal, and the step portion can thus easily be formed.

A method of manufacturing a power storage device according to the present disclosure includes (i) preparing a lid, the lid including a first main surface and a second main surface located at opposing ends in a direction of thickness and a through hole which extends from the first main surface to the second main surface, (ii) arranging an external terminal having an insertion hole on a side of the first main surface such that the through hole and the insertion hole communicate with each other, the external terminal including an opposed surface opposed to the first main surface and an outer surface located opposite to the opposed surface, the insertion hole extending from the opposed surface toward the outer surface, (iii) inserting a shaft of a collector terminal into the insertion hole and the through hole from a side of the second main surface such that the shaft protrudes from the outer surface, (iv) forming a projection at an end of the shaft by riveting the end of the shaft which protrudes from the outer surface, and (v) welding the projection and the external terminal. The external terminal is provided with a step portion located around an opening in the insertion hole located on a side of the outer surface. The projection of the collector terminal includes a contact surface in contact with a surface of the step portion. The projection and the step portion are welded in the welding the projection and the external terminal.

According to the method of manufacturing a power storage device, production of a gap between the surface of the step portion and the projection can be suppressed, and production of a void in the welding portion which welds the projection and the step portion can be suppressed.

The surface of the step portion is formed as extending away from an opening edge in a direction from a side of the opposed surface toward the outer surface.

According to the method of manufacturing a power storage device, production of a gap between the surface of the step portion and the projection in a process of forming the projection can be suppressed, and consequently production of a void in the welding portion can be suppressed.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
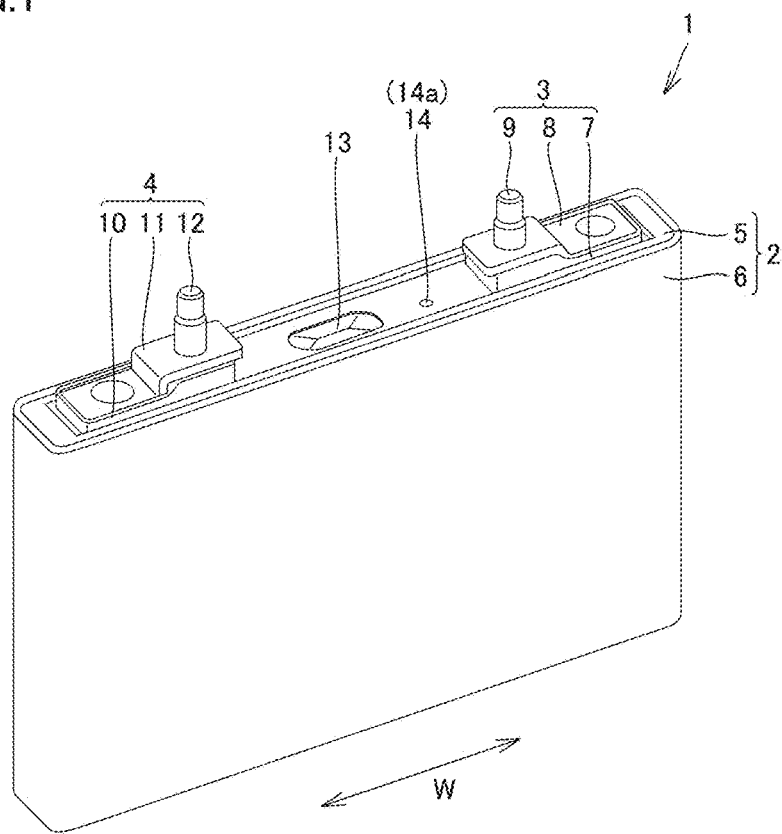
FIG. 1 is a perspective view showing a power storage device.

A power storage device and a method of manufacturing a power storage device according to the present embodiment will be described with reference to FIGS. 1-31. The same or substantially the same features among features shown in FIGS. 1-31 have the same reference characters allotted and redundant description will not be provided.

First Embodiment

FIG. 1 is a perspective view showing a power storage device 1. Power storage device 1 includes an accommodation case 2, a positive electrode external terminal 3, and a negative electrode external terminal 4. Accommodation case 2 includes a case main body 6 and a lid 5. Accommodation case 2 is formed, for example, of aluminum or an aluminum alloy.

Case main body 6 is formed to open upward and lid 5 is welded to an opening edge of case main body 6 to close an opening in case main body 6.

Positive electrode external terminal 3 and negative electrode external terminal 4 are provided on an upper surface (a first main surface) of lid 5. Positive electrode external terminal 3 and negative electrode external terminal 4 are provided at a distance from each other in a direction of width W of power storage device 1.

Positive electrode external terminal 3 includes an insulating member 7, a plate-shaped member 8, and a terminal bolt 9. Insulating member 7 is arranged on the upper surface of lid 5. Plate-shaped member 8 is provided on an upper surface of insulating member 7. Terminal bolt 9 is arranged on the upper surface of insulating member 7 and arranged to protrude upward from a through hole formed in plate-shaped member 8. Plate-shaped member 8 and terminal bolt 9 are formed of aluminum or an aluminum alloy.

Negative electrode external terminal 4 is also similar in construction to positive electrode external terminal 3. Negative electrode external terminal 4 includes an insulating member 10, a plate-shaped member 11, and a terminal bolt 12. Insulating member 10 is arranged on the upper surface of lid 5 and plate-shaped member 11 and terminal bolt 12 are provided on an upper surface of insulating member 10. Terminal bolt 12 is inserted in a through hole formed in plate-shaped member 11 and formed to protrude upward from an upper surface of plate-shaped member 11. Plate-shaped member 11 and terminal bolt 12 are formed of copper or a copper alloy.

A pressure release valve 13 and a sealing member 14 are formed in lid 5. Pressure release valve 13 and sealing member 14 are arranged between positive electrode external terminal 3 and negative electrode external terminal 4.

Pressure release valve 13 is formed to be smaller in thickness than other portions of lid 5. Therefore, the pressure release valve breaks when an internal pressure in accommodation case 2 is equal to or higher than a prescribed level. As pressure release valve 13 breaks, gas in accommodation case 2 is released to the outside. Sealing member 14 is a member which closes a liquid inlet 14a.

Figure 2:
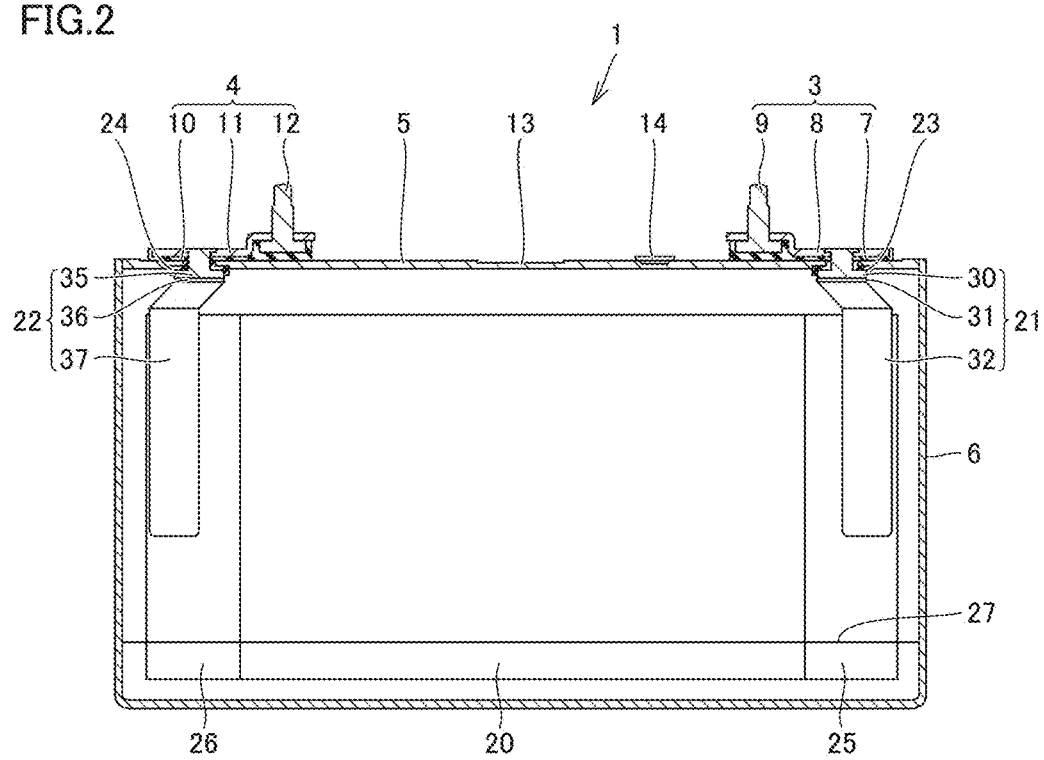
FIG. 2 is a cross-sectional view showing the power storage device.

FIG. 2 is a cross-sectional view showing power storage device 1. Power storage device 1 includes an electrode assembly 20, a positive electrode collector terminal 21, a negative electrode collector terminal 22, insulating members 23 and 24, and an electrolyte 27. Electrode assembly 20, positive electrode collector terminal 21, negative electrode collector terminal 22, insulating members 23 and 24, and electrolyte 27 are accommodated in accommodation case 2.

Electrode assembly 20 includes a positive electrode sheet, a negative electrode sheet, and a separator. Electrode assembly 20 may be of a wound type or a stack type. Electrode assembly 20 includes a positive electrode portion 25 and a negative electrode portion 26. Positive electrode portion 25 is formed on a side of one end of electrode assembly 20 and negative electrode portion 26 is formed at the other end of electrode assembly 20.

Insulating member 23 is arranged between positive electrode collector terminal 21 and lid 5, and it isolates positive electrode collector terminal 21 and lid 5 from each other. Insulating member 24 is arranged between negative electrode collector terminal 22 and lid 5, and it isolates negative electrode collector terminal 22 and lid 5 from each other.

Figure 3:
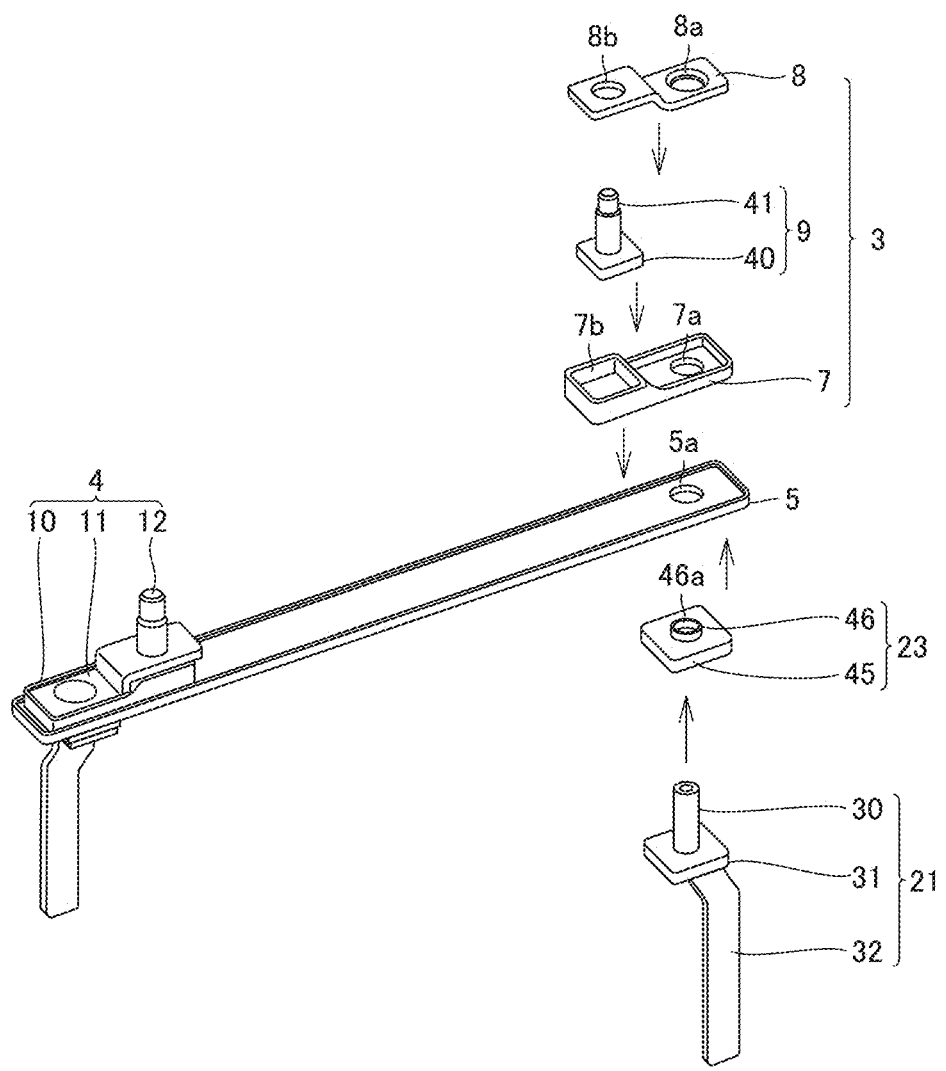
FIG. 3 is an exploded perspective view showing a lid and features around the same.

FIG. 3 is an exploded perspective view showing lid 5 and features around the same. A through hole 5a is formed on the side of one end of lid 5. A through hole is formed also on a side of the other end of lid 5.

Insulating member 7 of positive electrode external terminal 3 is arranged on the upper surface of lid 5, and a through hole 7a and a recess 7b are formed in insulating member 7. Recess 7b is formed in the upper surface of insulating member 7. Insulating member 7 is arranged on the upper surface of lid 5 such that through hole 7a communicates with through hole 5a.

Terminal bolt 9 includes a base 40 and a shaft 41. Base 40 is arranged in recess 7b. Shaft 41 is formed to protrude upward from an upper surface of base 40.

Plate-shaped member 8 is in a form of a plate. Plate-shaped member 8 is formed of aluminum or an aluminum alloy. A through hole 8a and a through hole 8b are formed in plate-shaped member 8. Plate-shaped member 8 is arranged on the upper surface of insulating member 7 such that through hole 8a, through hole 7a, and through hole 5a communicate with one another. Shaft 41 of terminal bolt 9 is inserted in through hole 8b.

Insulating member 23 includes a base 45 and a cylindrical portion 46. Cylindrical portion 46 is formed to protrude upward from an upper surface of base 45. A through hole 46a which passes through base 45 and cylindrical portion 46 is formed in insulating member 23.

Positive electrode collector terminal 21 is formed of aluminum or an aluminum alloy. Positive electrode collector terminal 21 includes a protrusion 30, a base 31, and a leg 32. Protrusion 30 is formed to protrude upward from an upper surface of base 31. Protrusion 30 is inserted in through hole 46a, through hole 5a, through hole 7a, and through hole 8a. Leg 32 is formed to extend downward from base 31. In FIG. 2, an upper end of protrusion 30 is riveted to be engaged with plate-shaped member 8. Leg 32 is welded to positive electrode portion 25.

Negative electrode collector terminal 22 is also similar in construction to positive electrode collector terminal 21. Negative electrode collector terminal 22 is formed of copper or a copper alloy. Negative electrode collector terminal 22 includes a protrusion 35, a base 36, and a leg 37. Protrusion 35 is formed to protrude upward from an upper surface of base 36. An upper end of protrusion 35 is riveted to be engaged with plate-shaped member 11.

Figure 4:
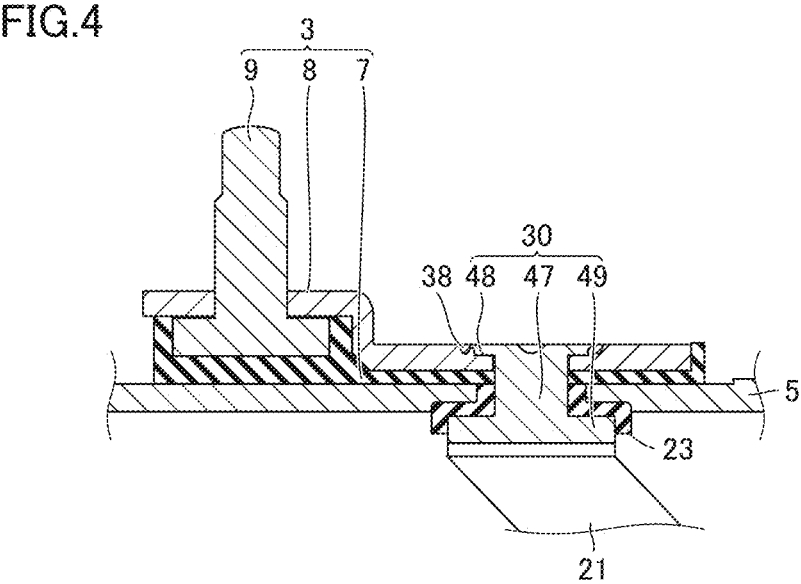
FIG. 4 is a cross-sectional view showing a protrusion of a positive electrode collector terminal and features around the same.

FIG. 4 is a cross-sectional view showing protrusion 30 of positive electrode collector terminal 21 and features around the same. Protrusion 30 of positive electrode collector terminal 21 includes a base 49, a shaft 47, and a projection 48.

Shaft 47 is formed to protrude upward from an upper surface of base 49 and projection 48 is formed at an upper end of shaft 47. Projection 48 is formed to extend outward from the upper end of shaft 47. Projection 48 is arranged at the upper surface of plate-shaped member 8. Projection 48 is engaged with plate-shaped member 8.

Insulating member 23 is arranged on a lower surface (a second main surface) of lid 5, and positive electrode external terminal 3, insulating member 23, and positive electrode collector terminal 21 are integrally coupled to one another by engagement of projection 48 with plate-shaped member 8.

Power storage device 1 includes a welding portion 38 which welds positive electrode external terminal 3 and projection 48 of protrusion 30 so that positive electrode external terminal 3 and protrusion 30 are firmly bonded to each other by welding portion 38.

Figure 5:
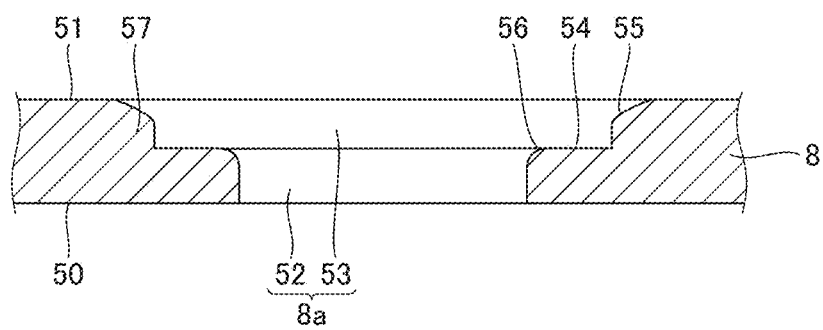
FIG. 5 is a cross-sectional view showing a through hole in a plate-shaped member and features around the same.

FIG. 5 is a cross-sectional view showing through hole 8a in plate-shaped member 8 and features around the same. Plate-shaped member 8 includes an opposed surface 50 and an outer surface 51. Opposed surface 50 is opposed to the upper surface of lid 5 with insulating member 7 being interposed. Outer surface 51 is located opposite to opposed surface 50.

In the present embodiment, through hole 8a is formed to extend from opposed surface 50 to outer surface 51. Through hole 8a is defined by an insertion hole 52 and a recess 53. Insertion hole 52 is formed to extend from opposed surface 50 toward outer surface 51. Recess 53 is formed on a side of outer surface 51 relative to insertion hole 52.

Recess 53 includes a bottom surface 54 and an inner circumferential surface 55. Insertion hole 52 is connected to bottom surface 54 and an opening edge 56 of insertion hole 52 is formed in bottom surface 54.

Bottom surface 54 is formed as being flat. Inner circumferential surface 55 is formed to extend from an outer circumferential edge of bottom surface 54 toward outer surface 51. Inner circumferential surface 55 is formed to extend from the outer circumferential edge of bottom surface 54 toward outer surface 51 as extending away from opening edge 56.

Therefore, a step portion 57 is formed by bottom surface 54 and inner circumferential surface 55. Inner circumferential surface 55 also serves as an inner circumferential surface of step portion 57. Step portion 57 is annularly formed and inner circumferential surface 55 is also annularly formed.

Figure 6:
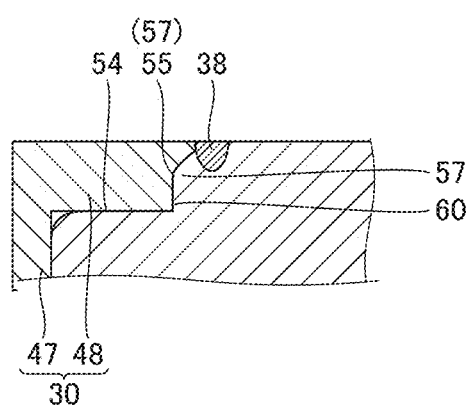
FIG. 6 is a cross-sectional view showing the protrusion and features around the same.

FIG. 6 is a cross-sectional view showing protrusion 30 and features around the same. Projection 48 includes a circumferential surface 60, and projection 48 is in contact with inner circumferential surface 55 of step portion 57. Specifically, circumferential surface 60 of projection 48 is curved along inner circumferential surface 55 of step portion 57 and in contact with substantially the entire inner circumferential surface 55. Projection 48 is a contact surface in contact with step portion 57.

Welding portion 38 welds projection 48 which is the contact surface and step portion 57. Welding portion 38 may be formed annularly or discontinuously around the outer circumferential edge of projection 48.

Though the construction of positive electrode external terminal 3 and positive electrode collector terminal 21 is described in detail, negative electrode external terminal 4 and negative electrode collector terminal 22 are also similar in construction.

A method of manufacturing power storage device 1 constructed as above will now be described. A process of manufacturing power storage device 1 includes a lid unit forming step, an electrode assembly forming step, an electrode assembly welding step, an accommodation step, a lid welding step, a liquid introduction step, and a sealing step.

The lid unit forming step is a step of integrating lid 5, positive electrode external terminal 3, negative electrode external terminal 4, positive electrode collector terminal 21, and negative electrode collector terminal 22. Specifically, the lid unit forming step includes steps of coupling positive electrode collector terminal 21, positive electrode external terminal 3, and lid 5 to one another and coupling negative electrode collector terminal 22, negative electrode external terminal 4, and lid 5 to one another.

The electrode assembly forming step includes a step of successively stacking positive electrode sheets, separators, and negative electrode sheets.

The electrode assembly welding step includes steps of welding leg 32 of positive electrode collector terminal 21 to positive electrode portion 25 of the electrode assembly, and welding leg 37 of negative electrode collector terminal 22 to negative electrode portion 26.

The accommodation step includes steps of accommodating the electrode assembly welded to the lid unit in case main body 6 and arranging lid 5 in an opening in case main body 6, and welding an outer peripheral edge of lid 5 to the opening edge of case main body 6.

The liquid introduction step is a step of introducing electrolyte 27 into accommodation case 2 through liquid inlet 14a. The sealing step is a step of sealing liquid inlet 14a with sealing member 14.

Figure 7:
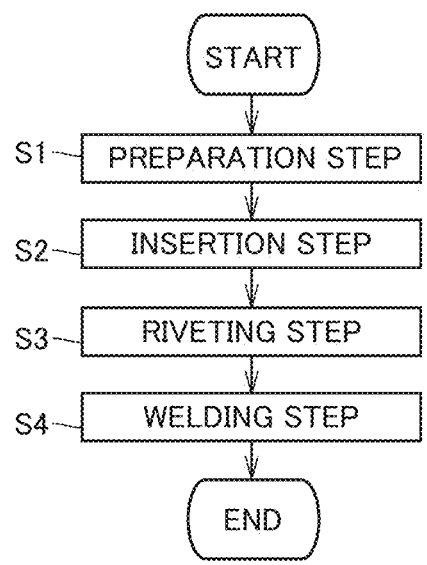
FIG. 7 is a flowchart showing a coupling step of coupling a positive electrode collector terminal, a positive electrode external terminal, and a lid to one another.

FIG. 7 is a flowchart showing a coupling step of coupling positive electrode collector terminal 21, positive electrode external terminal 3, and lid 5 to one another. The coupling step includes a preparation step S1, an insertion step S2, a riveting step S3, and a welding step S4.

Figure 8:
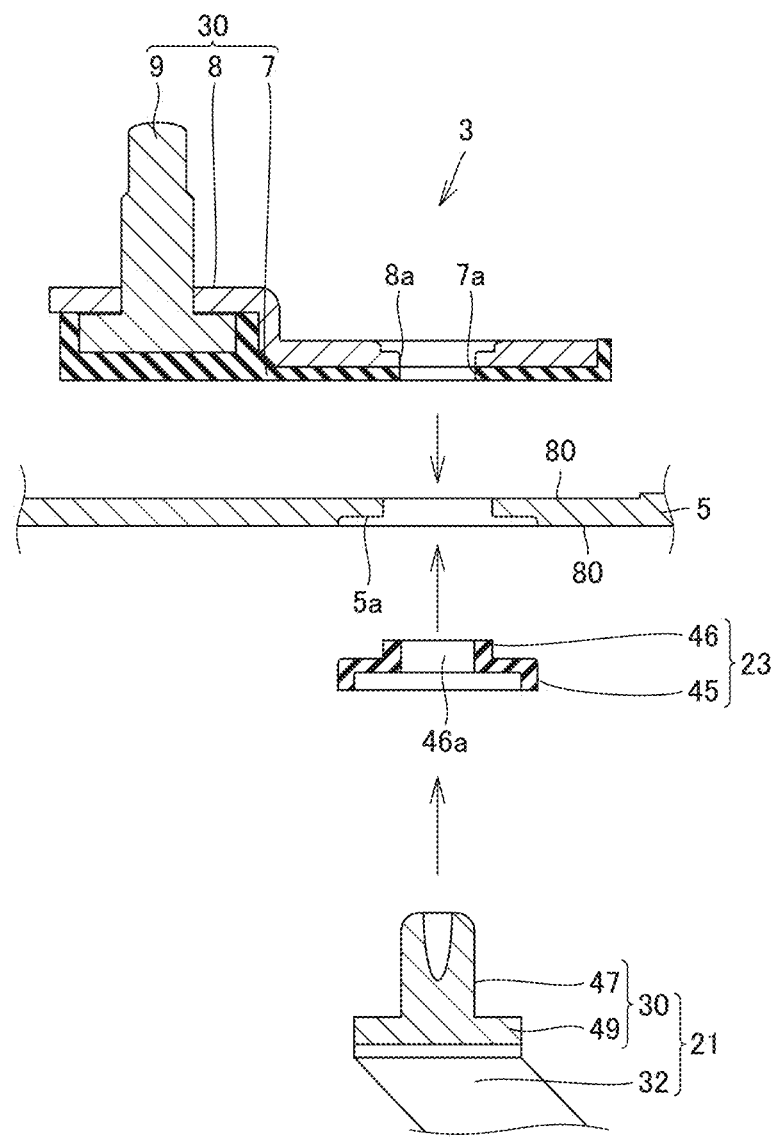
FIG. 8 is a cross-sectional view schematically showing a preparation step.

FIG. 8 is a cross-sectional view schematically showing preparation step S1. In preparation step S1, positive electrode external terminal 3, lid 5, insulating member 23, and positive electrode collector terminal 21 are prepared. Positive electrode external terminal 3 is arranged on the upper surface of lid 5. Insulating member 23, lid 5, and plate-shaped member 8 are arranged such that through hole 5a, through hole 7a, and through hole 8a communicate with one another.

Insulating member 23 is arranged on a side of the lower surface of lid 5. Specifically, insulating member 23 is inserted in through hole 5a in lid 5. Through hole 46a, through hole 7a, and through hole 8a thus communicate with one another.

Figure 9:
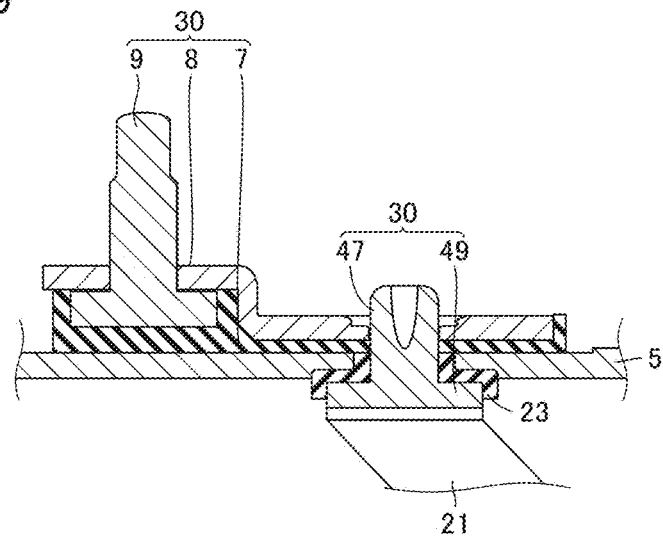
FIG. 9 is a cross-sectional view schematically showing an insertion step.

FIG. 9 is a cross-sectional view schematically showing insertion step S2. As shown in FIG. 9, shaft 47 of positive electrode collector terminal 21 is inserted from the side of the lower surface of lid 5, and shaft 47 is inserted in through hole 46a, through hole 7a, and through hole 8a. The upper end of shaft 47 protrudes upward relative to the upper surface of plate-shaped member 8. No projection 48 has not yet been formed at the upper end of shaft 47.

Figure 10:
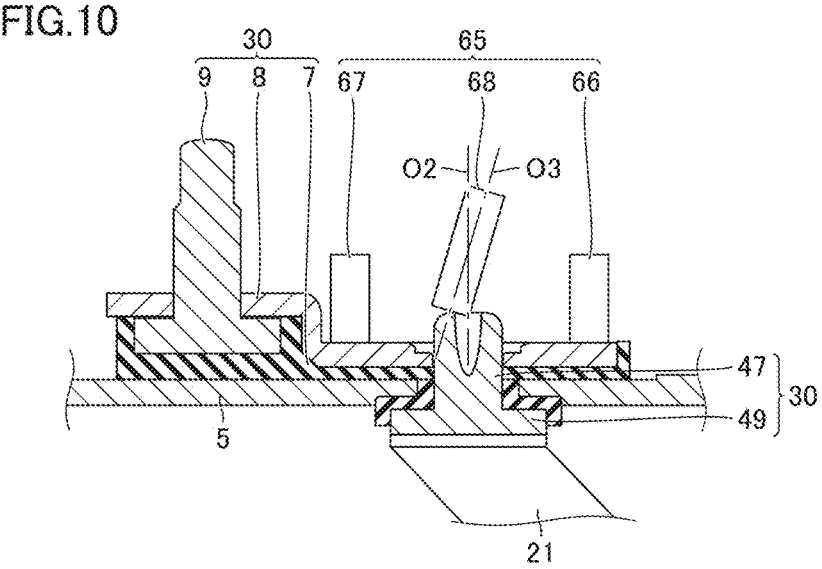
FIG. 10 is a cross-sectional view schematically showing a riveting step.

FIG. 10 is a cross-sectional view schematically showing riveting step S3. In riveting step S3, a riveting apparatus 65 deforms the upper end of shaft 47.

Riveting apparatus 65 includes pressing members 66 and 67 and a rotatable roller 68. Pressing members 66 and 67 are members which press plate-shaped member 8 from above. Rotatable roller 68 rotates around a rotation centerline O2. Rotation centerline O2 passes through the center of shaft 47. Rotatable roller 68 is in a columnar shape and arranged such that a centerline O3 of rotatable roller 68 is inclined with respect to rotation centerline O2.

Rotatable roller 68 is rotated around rotation centerline O2 while rotatable roller 68 is pressed against the upper end of shaft 47. The upper end of shaft 47 is thus riveted.

Figure 11:
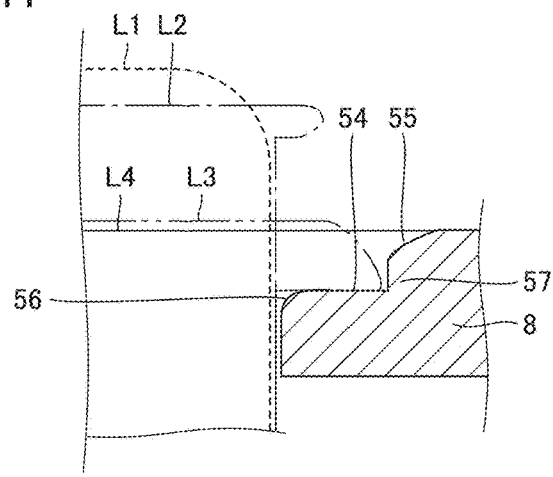
FIG. 11 is a cross-sectional view schematically showing a process of deformation of a shaft during the course of the riveting step.

FIG. 11 is a cross-sectional view schematically showing a process of deformation of shaft 47 during the course of riveting step S3.

A dashed line L1 represents shaft 47 in an initial stage of riveting step S3. A chain dotted line L2 represents shaft 47 in an intermediate stage of riveting step S3. A chain double dotted line L3 represents shaft 47 in a final stage of riveting step S3. A solid line L4 represents shaft 47 in a stage of completion.

In the initial stage of riveting step S3, the upper end of shaft 47 deforms to swell. In the intermediate stage of riveting step S3, a height of shaft 47 becomes lower and the swollen portion is in contact with bottom surface 54. In the final stage, the height of shaft 47 becomes further lower and the swollen portion deforms along inner circumferential surface 55.

The swollen portion resulting from deformation of the upper end of shaft 47 sequentially deforms upward from a side of a lower end of inner circumferential surface 55. Inner circumferential surface 55 is formed as extending away from opening edge 56 in a direction from the outer circumferential edge of bottom surface 54 toward outer surface 51.

Therefore, in deformation of the swollen portion resulting from deformation of the upper end of shaft 47 along inner circumferential surface 55, production of a gap between the swollen portion of shaft 47 and inner circumferential surface 55 can be suppressed. The swollen portion of shaft 47 becomes projection 48 and production of a gap between projection 48 and step portion 57 is suppressed.

Figure 12:
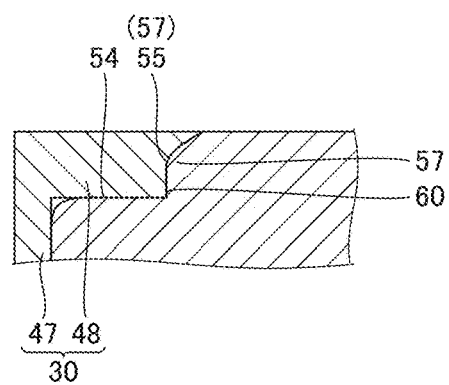
FIG. 12 is a cross-sectional view showing a state that the riveting step is completed.

FIG. 12 is a cross-sectional view showing a state that riveting step S3 is completed. As shown in FIG. 12, projection 48 is formed and substantially the entire circumferential surface 60 of projection 48 is in contact with inner circumferential surface 55.

Figure 13:
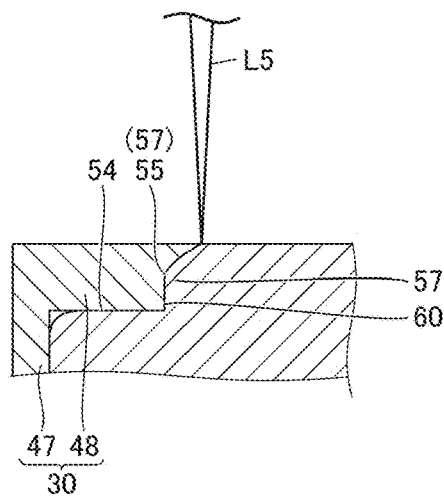
FIG. 13 is a cross-sectional view showing a welding step.
Figure 14:
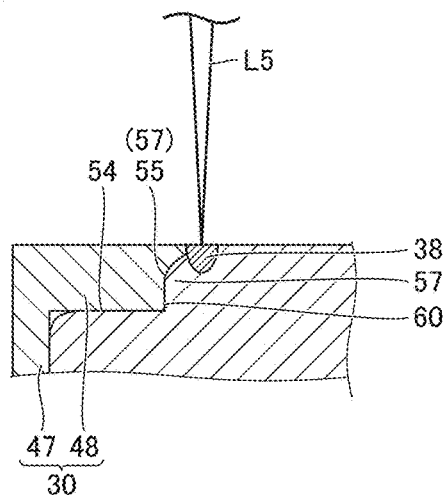
FIG. 14 is a cross-sectional view showing formation of a welding portion in the welding step.

FIG. 13 is a cross-sectional view showing welding step S4. As shown in FIG. 13, laser beams L5 are emitted to the outer circumferential edge of projection 48 and inner circumferential surface 55. Specifically, laser beams L5 are emitted toward the upper end of step portion 57. Welding portion 38 is thus formed as shown in FIG. 14.

Figure 15:
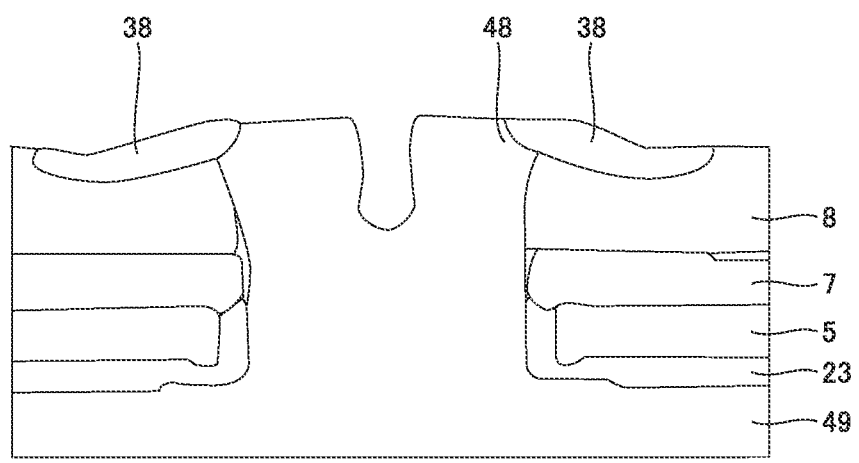
FIG. 15 is a schematic diagram showing a cross-sectional structure of the welding portion and a portion around the same.

FIG. 15 is a schematic diagram showing the photograph shown a cross-sectional structure of the welding portion and a portion around the same.

As shown in FIG. 15, it can be seen that no void is formed in welding portion 38 and a portion around the same.

According to power storage device 1 and the method of manufacturing power storage device 1 according to the present first embodiment, production of a void in welding portion 38 and a portion around the same can be suppressed. Projection 48 and plate-shaped member 8 can thus satisfactorily be connected to each other.

Though inner circumferential surface 55 is formed as being curved in the first embodiment, it may be formed as being inclined (in a form of a frustum).

A method of manufacturing a power storage device 1A according to a comparative example will now be described and compared with the method of manufacturing power storage device 1 according to the present first embodiment.

The method of manufacturing power storage device 1A according to the comparative example includes a lid unit forming step, an electrode assembly forming step, an electrode assembly welding step, an accommodation step, a lid welding step, a liquid introduction step, and a sealing step similarly to the method of manufacturing power storage device 1 according to the present first embodiment. The lid unit forming step in the comparative example, however, is different from the lid unit forming step in the first embodiment.

Figure 16:
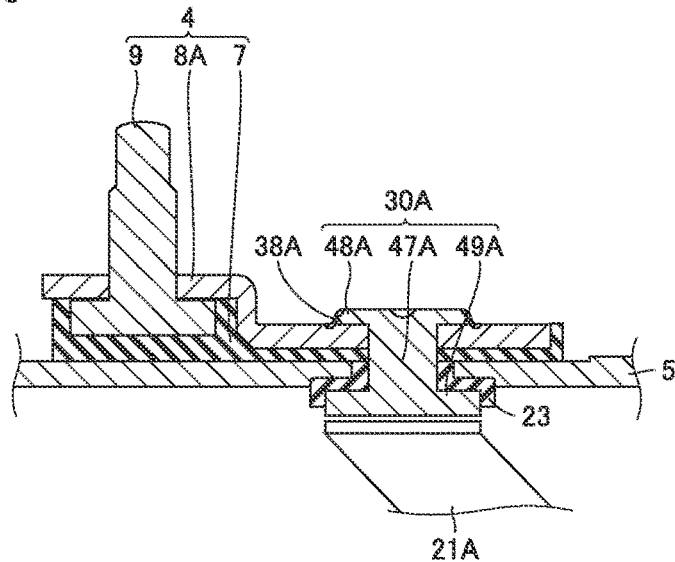
FIG. 16 is a cross-sectional view showing a protrusion of a power storage device according to a comparative example and features around the same.

FIG. 16 is a cross-sectional view showing a protrusion 30A of power storage device 1A according to the comparative example and features around the same. A positive electrode collector terminal 21A of power storage device 1A includes protrusion 30A. Protrusion 30A includes a base 49A, a shaft 47A, and a projection 48A.

Figure 17:
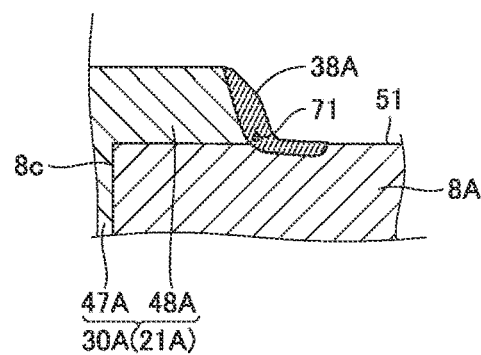
FIG. 17 is a cross-sectional view showing a projection and features around the same.

FIG. 17 is a cross-sectional view showing projection 48A and features around the same. Plate-shaped member 8A includes the opposed surface and outer surface 51.

A through hole 8c is provided in plate-shaped member 8A. Through hole 8c is provided to extend from the opposed surface to outer surface 51. An area of opening of through hole 8c is set to be constant from a side of the opposed surface toward outer surface 51. Therefore, no step portion is formed in plate-shaped member 8A of power storage device 1A.

A welding portion 38A is formed to extend from an outer circumferential surface of projection 48A to outer surface 51 of plate-shaped member 8A.

Figure 18:
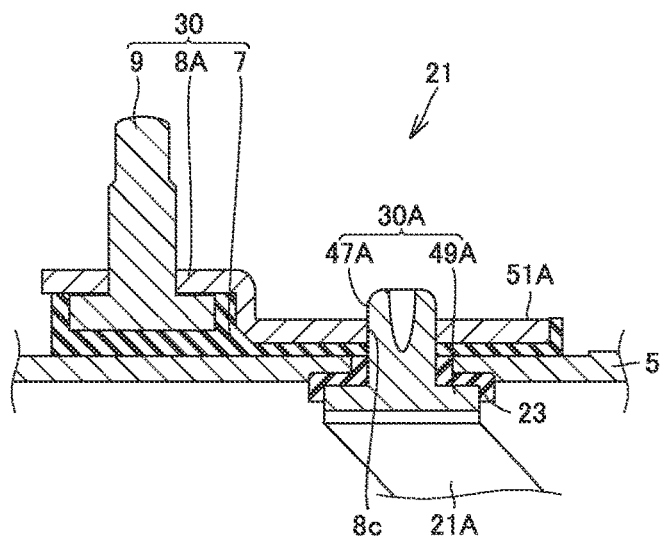
FIG. 18 is a cross-sectional view showing an insertion step in the coupling step.

A coupling step of coupling positive electrode collector terminal 21, positive electrode external terminal 3, and the lid of power storage device 1A constructed as above will be described. FIG. 18 is a cross-sectional view showing an insertion step in the coupling step. In the insertion step for power storage device 1A, shaft 47A is inserted in through hole 8c in plate-shaped member 8A. An upper end of shaft 47A protrudes upward relative to outer surface 51 of plate-shaped member 8A.

Figure 19:
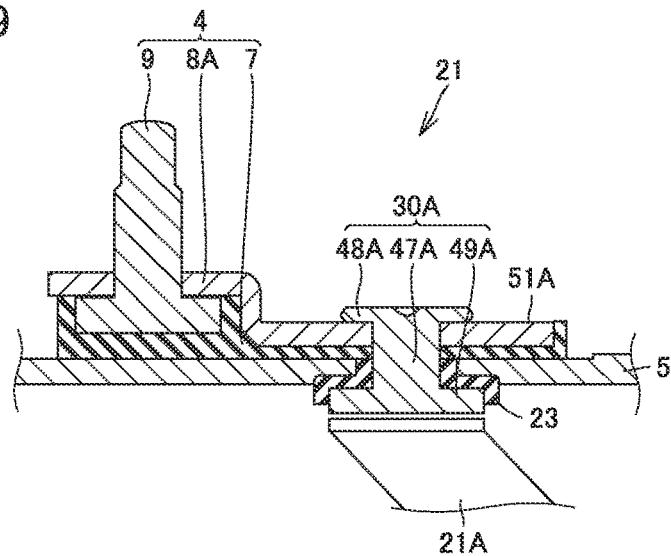
FIG. 19 is a cross-sectional view after the riveting step.

FIG. 19 is a cross-sectional view after the riveting step. As a result of the riveting step, projection 48A is formed. Projection 48A is formed on outer surface 51 of plate-shaped member 8A.

Figure 20:
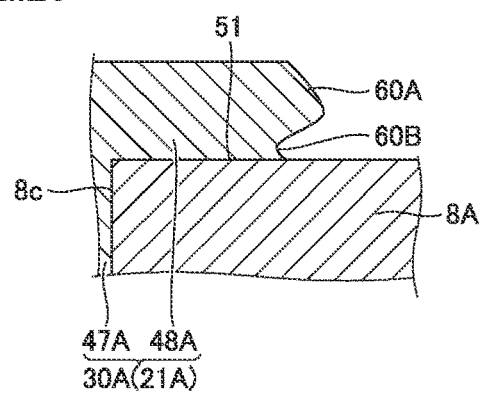
FIG. 20 is a cross-sectional view of a part of the projection as being enlarged.

FIG. 20 is a cross-sectional view of a part of projection 48A as being enlarged. A circumferential surface 60A of projection 48A is formed such that its center in a direction of height projects outward. In circumferential surface 60A, a curved portion 60B recessed in a direction toward through hole 8c is formed on a side of outer surface 51 of plate-shaped member 8A.

Figure 21:
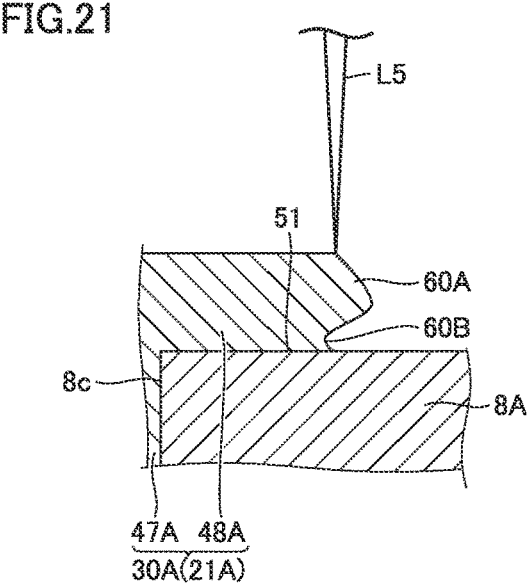
FIG. 21 is a cross-sectional view showing the welding step.

FIG. 21 is a cross-sectional view showing the welding step. As shown in FIG. 21, laser beams L5 are emitted to a portion around a boundary between the upper surface of projection 48A and circumferential surface 60A.

Figure 22:
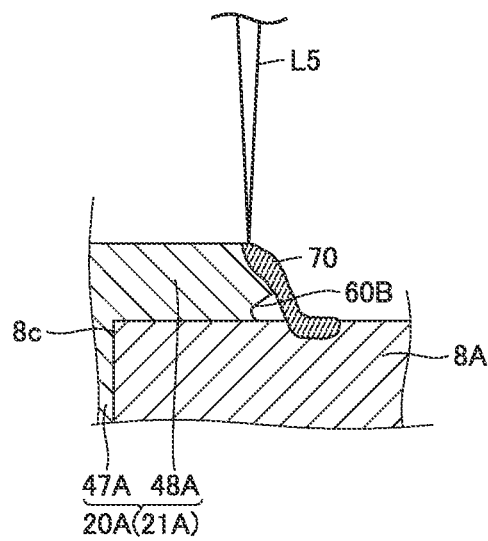
FIG. 22 is a cross-sectional view showing an initial state of the welding step.

FIG. 22 is a cross-sectional view showing an initial state of the welding step. As laser beams L5 are emitted to projection 48A, a part of projection 48A is molten to form a molten portion 70. Molten portion 70 runs downward and fills an opening in curved portion 60B.

Figure 23:
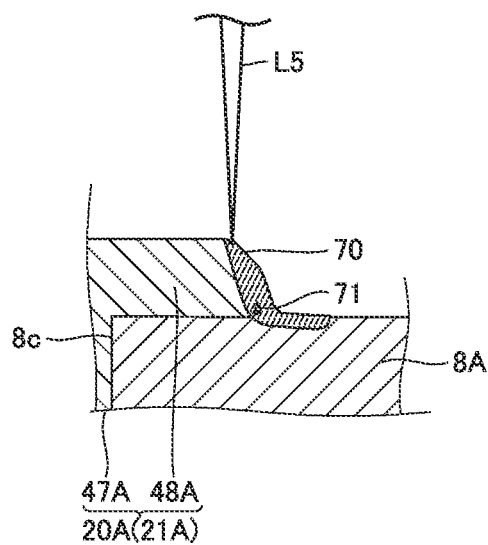
FIG. 23 is a cross-sectional view showing a final state of the welding step.

FIG. 23 is a cross-sectional view showing a final state of the welding step. As welding proceeds, molten portion 70 enters also curved portion 60B. As shown in FIG. 23, welding portion 70 may not completely fill curved portion 60B and a void 71 may be produced. Welding portion 38A is formed as molten portion 70 is cooled.

Figure 24:
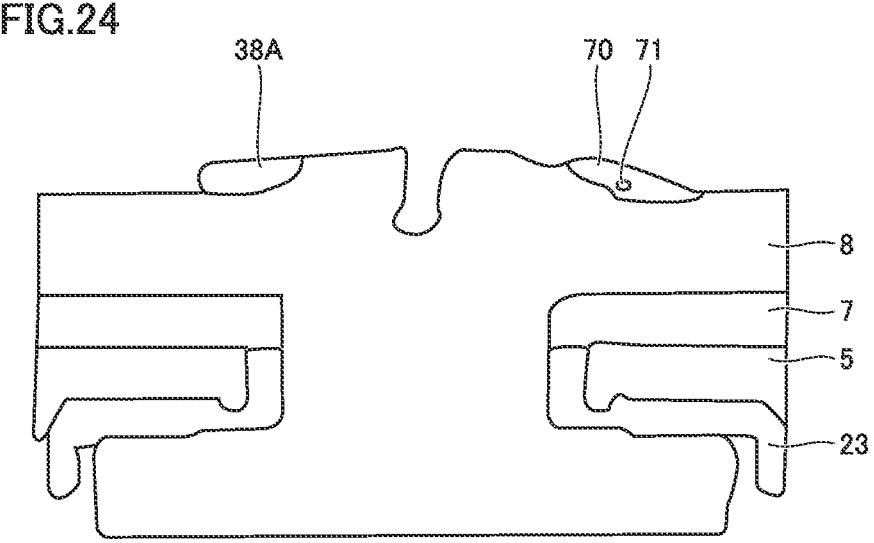
FIG. 24 is a schematic diagram showing a cross-section after the welding step is completed.

FIG. 24 is a schematic diagram showing a cross-section after the welding step is completed. As shown in FIG. 24, it can be seen that void 71 is produced.

As shown in FIG. 15, according to power storage device 1 and the method of manufacturing power storage device 1 according to the present first embodiment, production of void 71 can be suppressed.

Second Embodiment

A power storage device 1B and a method of manufacturing the same according to a second embodiment will be described with reference to FIG. 25.

Power storage device 1B is substantially identical in construction to power storage device 1 except for a construction of plate-shaped member 8 and plate-shaped member 11. Since plate-shaped members in power storage device 1B are close to each other in shape, a plate-shaped member 8B will be described.

Figure 25:
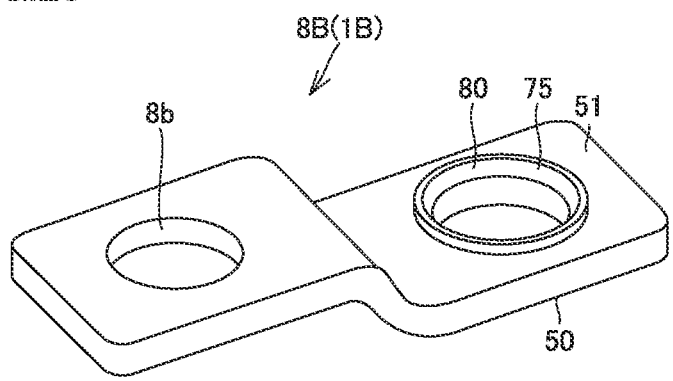
FIG. 25 is a perspective view showing a plate-shaped member.

FIG. 25 is a perspective view showing plate-shaped member 8B. Plate-shaped member 8B includes a step portion (raised portion) 75 and step portion 75 is annularly formed on outer surface 51 so as to protrude upward from outer surface 51.

Figure 26:
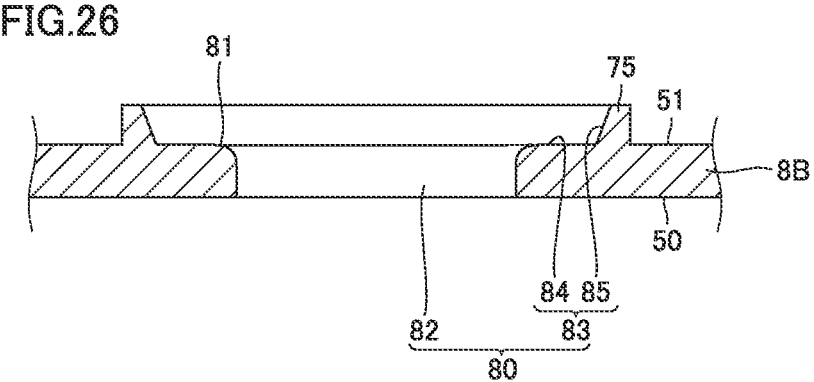
FIG. 26 is a cross-sectional view showing a step portion and features around the same.

FIG. 26 is a cross-sectional view showing step portion 75 and features around the same.

A through hole 80 is formed in plate-shaped member 8B. Through hole 80 is defined by an insertion hole 82 and an inner surface 83 of step portion 75.

Through hole 80 is formed to extend from opposed surface 50 of plate-shaped member 8B to outer surface 51. Inner surface 83 of step portion 75 includes a bottom surface 84 which is a part of outer surface 51 and an inner circumferential surface 85.

Insertion hole 82 communicates with bottom surface 84, and an opening edge 81 of insertion hole 82 is formed around bottom surface 84. Bottom surface 84 is formed as being flat and inner circumferential surface 85 is connected to an outer edge of bottom surface 84. Inner circumferential surface 85 is formed as extending away from opening edge 81 upward from the outer circumferential edge of bottom surface 84.

The plate-shaped member of the negative electrode external terminal is also formed similarly to plate-shaped member 8B.

A method of manufacturing power storage device 1B constructed as above will be described. The method of manufacturing power storage device 1 according to the first embodiment is substantially the same as the method of manufacturing power storage device 1B according to the present second embodiment in steps other than the "coupling step of coupling the positive electrode collector terminal, the positive electrode external terminal, and the lid to one another" and the "coupling step of coupling the negative electrode collector terminal, the negative electrode external terminal, and the lid to one another."

Since the "coupling step of coupling the positive electrode collector terminal, the positive electrode external terminal, and the lid to one another" is similar to the "coupling step of coupling the negative electrode collector terminal, the negative electrode external terminal, and the lid to one another," the "coupling step of coupling the positive electrode collector terminal, the positive electrode external terminal, and the lid to one another" will mainly be described.

Figure 27:
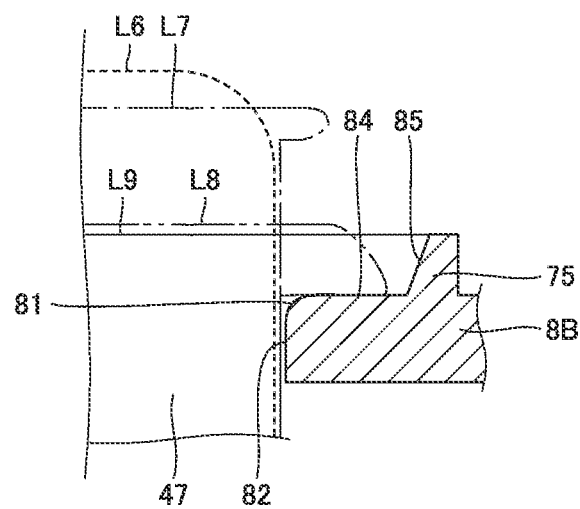
FIG. 27 is a schematic diagram showing the riveting step in the coupling step of coupling the positive electrode collector terminal, the positive electrode external terminal, and the lid to one another.

FIG. 27 is a schematic diagram showing the riveting step in the coupling step of coupling the positive electrode collector terminal, the positive electrode external terminal, and the lid to one another.

In FIG. 27, a dashed line L6 represents shaft 47 in the initial stage of the riveting step. A chain dotted line L7 represents shaft 47 in the intermediate stage of the riveting step. A chain double dotted line L8 represents shaft 47 in the final stage of the riveting step. A solid line L9 represents shaft 47 in the stage of completion.

In the initial stage of riveting step S3, the upper end of shaft 47 deforms to swell. In the intermediate stage of riveting step S3, a height of shaft 47 becomes lower and the swollen portion is in contact with bottom surface 84. In the final stage, the height of shaft 47 becomes further lower and the swollen portion comes in contact with inner circumferential surface 85.

As the riveting step further proceeds, the swollen portion of shaft 47 deforms along inner circumferential surface 85. The swollen portion of shaft 47 thus deforms to gradually run upward along the inner circumferential surface of step portion 75 from a side of the lower end of inner circumferential surface 85. Finally, the swollen portion of shaft 47 becomes projection 48. Thus, production of a gap between inner circumferential surface 85 and projection 48 is suppressed.

Consequently, even though laser beams L5 are used to weld shaft 47 and step portion 75 in welding step S4, production of a void in the welding portion can be suppressed.

Similarly, production of a void can be suppressed also in the plate-shaped member of the negative electrode external terminal.

Figure 28:
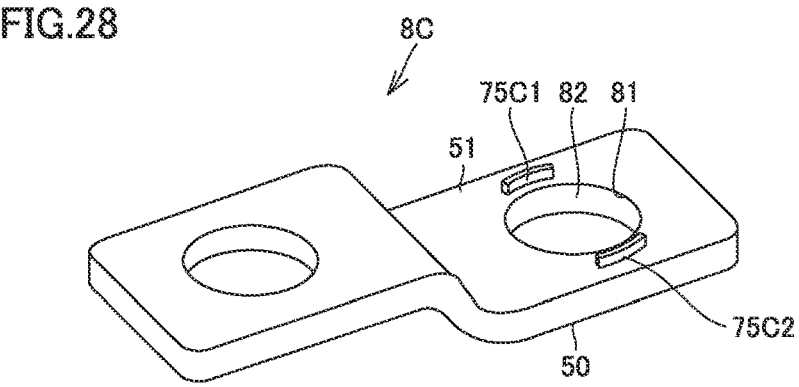
FIG. 28 is a perspective view showing a plate-shaped member according to a first modification of the plate-shaped member.

FIG. 28 is a perspective view showing a plate-shaped member 8C according to a first modification of the plate-shaped member. In plate-shaped member 8C, step portions 75C1 and 75C2 are formed instead of step portion 75 shown in FIG. 25. Step portions 75C1 and 75C2 are formed at a distance from each other on outer surface 51 around opening edge 81.

Figure 29:
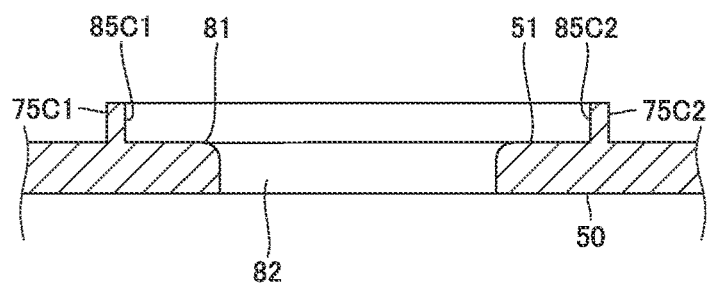
FIG. 29 is a cross-sectional view showing the plate-shaped member.

FIG. 29 is a cross-sectional view showing plate-shaped member 8C. As shown in FIG. 29, inner peripheral surfaces 85C1 and 85C2 of step portions 75C1 and 75C2 are formed to extend substantially perpendicularly to outer surface 51.

Even though plate-shaped member 8C is employed, production of a gap between projection 48 formed in shaft 47 and inner peripheral surfaces 85C1 and 85C2 of step portions 75C1 and 75C2 can be suppressed.

Consequently, even though laser beams L5 are emitted to upper ends of step portions 75C1 and 75C2 to weld step portions 75C1 and 75C2 and projection 48 in welding step S4, production of a void in the welding portion can be suppressed.

Figure 30:
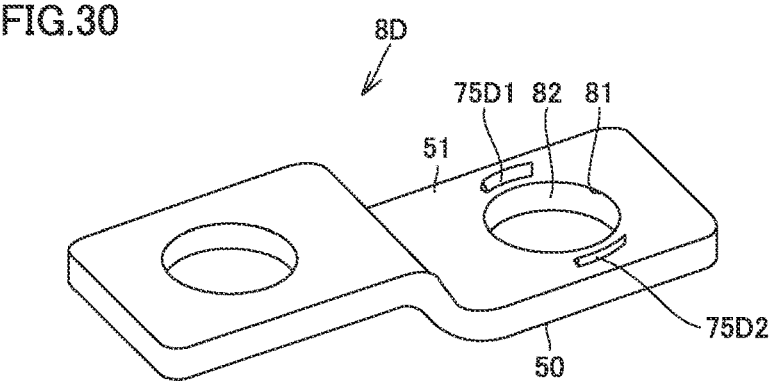
FIG. 30 is a perspective view showing a plate-shaped member representing a second modification of the plate-shaped member.
Figure 31:
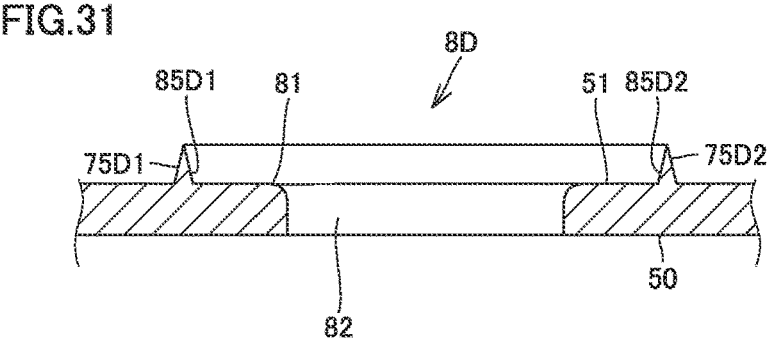
FIG. 31 is a cross-sectional view showing the plate-shaped member.

FIG. 30 is a perspective view showing a plate-shaped member 8D representing a second modification of plate-shaped member 8. Plate-shaped member 8D has step portions 75D1 and 75D2 formed around opening edge 81 of insertion hole 82. Step portions 75D1 and 75D2 are also arranged at a distance from each other. FIG. 31 is a cross-sectional view showing plate-shaped member 8D. As shown in FIG. 31, inner peripheral surfaces 85D1 and 85D2 of step portions 75D1 and 75D2 are formed as extending away from opening edge 81 upward from outer surface 51.

Though embodiments of the present disclosure have been described, it should be understood that the embodiments disclosed herein are illustrative and non-restrictive in every respect. The scope of the present disclosure is defined by the terms of the claims and is intended to include any modifications within the scope and meaning equivalent to the terms of the claims.

What is claimed is:

1. A power storage device comprising:
an electrode assembly;
an accommodation case which accommodates the electrode assembly;
an external terminal provided on an outer surface of the accommodation case, wherein the external terminal includes: an opposed surface opposed to the outer surface of the accommodation case and an outer surface located opposite to the opposed surface, an insertion hole which extends from the opposed surface toward the outer surface of the external terminal, and a step portion located around an opening in the insertion hole located on a side of the outer surface of the external terminal;
a collector terminal which is configured to be inserted through the opening in the insertion hole having the step portion; and
a welding portion which connects a contact surface the collector terminal with a surface of the step portion of the external terminal as a result of being welded.

2. The power storage device according to claim 1, wherein the surface of the step portion is formed as extending away from the opening in a direction from a side of the opposed surface toward the outer surface of the external terminal.

3. The power storage device according to claim 1, wherein a recess is formed in the surface of the external terminal, the recess includes a bottom surface and an inner circumferential surface located around the bottom surface, the insertion hole is connected to the bottom surface of the recess and the opening in the insertion hole is formed in the bottom surface of the recess, and the surface of the step portion serves as the inner circumferential surface of the recess.

4. The power storage device according to claim 1, wherein the external terminal includes a raised portion formed around the insertion hole, and the step portion is formed by the raised portion.

5. A method of manufacturing a power storage device comprising:

preparing a lid, the lid including a first main surface and a second main surface located at opposing ends in a direction of thickness and a through hole extending from the first main surface to the second main surface;

arranging an external terminal having an insertion hole on a side of the first main surface such that the through hole and the insertion hole communicate with each other, the external terminal including an opposed surface opposed to the first main surface and an outer surface located opposite to the opposed surface, the insertion hole extending from the opposed surface toward the outer surface, the external terminal including a step portion located around an opening in the insertion hole located on a side of the outer surface;

inserting a shaft of a collector terminal into the insertion hole already formed with the step portion and the through hole from a side of the second main surface such that the shaft protrudes from the outer surface;

forming a projection at an end of the shaft by riveting the end of the shaft which protrudes from the outer surface; and welding the projection and the external terminal, so that a contact surface of the projection of the collector terminal contacts a surface of the step portion as a result of the welding.

6. The method according to claim 5, wherein the surface of the step portion is formed as extending away from an opening edge in a direction from a side of the opposed surface toward the outer surface.

* * * * *